United States Patent Office 2,854,482
Patented Sept. 30, 1958

2,854,482

PROCESS FOR THE MANUFACTURE OF UREA

August Guyer, Zurich, Switzerland, assignor to Lonza Electric and Chemical Works Ltd., Basel, Switzerland, a corporation of Switzerland No Drawing. Application November 19, 1956
Serial No. 622,734

Claims priority, application Switzerland July 7, 1956

4 Claims. (Cl. 260—555)

This invention relates to improvements in the production of urea from ammonia and carbon dioxide at elevated temperatures and pressures. More particularly the invention relates to a new method of treatment of the urea-containing, degassed effluents from a pressure autoclave so as to reduce the quantity of decomposition products and biuret contained therein.

It is well known that when ammonia and carbon dioxide are subjected to high temperature in a closed system, high pressures are generated and urea is formed. For example, urea synthesis has been conducted at pressures of from about 200–350 atmospheres in an autoclave maintained at temperatures of 160°–220° C. During the synthesis reaction the ammonia and carbon dioxide primarily combine exothermically to form ammonium carbamate which at the temperature of the reaction is transformed into urea and water. The resulting reaction effluent contains in addition to urea and water, uncombined residues of the starting materials and ammonium carbonate, bicarbonate and carbamate.

It is also known to treat such urea synthesis effluent by a number of different procedures to free from it the unconverted ammonia and carbon dioxide reactants and to vaporize the water so as to obtain finally a relatively pure solid form of urea or to partially vaporize the water so as to obtain an aqueous urea solution. For example, it has been proposed in U. S. Patent 2,267,133 to vaporize ammonia, carbon dioxide and a portion of the water from a urea synthesis effluent while it is passing rapidly through an externally heated tube. The mixture of liquid and gas leaving the tube is treated to separate the gas from the liquid with the liquid thereafter being passed through a packed tower in countercurrent flow to a stream of hot air.

A degassed liquid urea solution (75–85% urea) may be obtained by other known degassification procedures and may be treated as above for final drying or may be crystallized in a centrifuge. Also, urea synthesis effluents have been treated by direct contact with steam or hot air for distilling the solution up to 95–99% after which the solution is cooled and directly used or is crystallized, granulated or prilled to form solid urea.

The above procedures for obtaining substantially pure urea liquor or solid forms of urea inherently lead to many undesirable physical and chemical characteristics in the urea product. Particularly such procedures lead to undesirable decomposition of urea to form biuret and ammonia because of the high temperatures and long time period of treatment required for degassification and distillation of the synthesis effluent to relatively pure aqueous urea or solid forms of urea. While the biuret content of the urea containing effluent withdrawn from a high pressure synthesis system is comparatively small, it increases appreciably when removing the unreacted initial materials ammonia and carbon dioxide, and the major part of the biuret content, which may amount to several percent is formed during subsequent recovery of high purity aqueous urea or solid urea.

In industrial applications where urea is used in combination with other chemicals, for instance with formaldehyde in textile finishing and treating solutions, biuret contained in the urea is completely undesirable because it causes turbidity of the solutions and, subsequently, destroys the brilliancy of the textile finish. Further, in the plastics industry high biuret urea must be rejected as producing a turbid product, while in the fertilizer and cattle feed industries high biuret urea has destroyed agricultural products and has been disclaimed as a safe fodder ingredient.

Several methods have been suggested for reducing the biuret content in urea. One such method is disclosed in U. S. Patent 2,663,731 wherein it is proposed to treat solidified or crystallized urea with an aqueous urea solution. By this treatment it is alleged that practically only biuret is dissolved out, the purified urea remaining substantially undissolved. In such procedures there is always a residue of urea solution containing dissolved biuret which requires further expensive and difficult processing.

It is an object of the present invention to provide a new and improved method for treating aqueous urea solutions whereby the content of undesired decomposition products is significantly reduced.

It is a further object of the invention to provide an economical method for treating aqueous urea solutions whereby the content of undesired biuret is materially reduced whereafter the biuret-free urea melt may be used as a solution or be treated in usual manner to obtain crystalline or granulated urea products.

Other objects and advantages of the invention will be apparent from the following specification in which the preferred embodiments and details of the invention are described.

Accordingly, the present invention accomplishes the above objects by the discovery that it is possible to very considerably reduce the biuret content of various kinds of urea solutions by subjecting such solutions to a pressure-temperature treatment in the presence of ammonia.

Surprisingly, by subjecting degassed biuret-containing urea solutions to treatment in the presence of ammonia under a pressure of from about 80 to 350 atmospheres and at a temperature of between 120° and 210° C. for periods of from about 15 minutes to two hours, it has been found that the originally high biuret content may be substantially reduced. In effect, the reaction carried out is the ammoniation of biuret to form urea. The urea solution thus substantially freed of biuret can be utilized in any known manner to obtain solid form urea such as by crystallization, prilling or granulation.

Although the process as described above is particularly advantageous for treating aqueous urea solutions such as result from a degassification of a urea synthesis melt (removal of substantially all of the carbon dioxide and at least part of the ammonia) it may also be utilized for treating the mother liquors of a crystallization process which usually contain an increased biuret content.

To accomplish the favorable results afforded by the process the ammoniation type treatment may be carried out in an autoclave or other pressure reactor. While the manner of application of the invention may be varied widely, the following examples will illustrate preferred modes of operation for varying solution conditions. Parts are by weight.

*Example 1*

A solution of 20 parts urea and 6 parts water, and containing 3.4% biuret, based upon the amount of urea, was heated in an autoclave to 190° C. in the presence of 20 parts of ammonia at about 150 atmospheres pressure. After one hour the pressure on the melt was reduced and the ammonia was expelled by rapid heating. The resulting biuret content of the treated melt was measured as 0.15%, based upon the amount of urea.

*Example 2*

A urea synthesis effluent containing 100 parts urea, 30 parts carbon dioxide, 90 parts ammonia and 29 parts water and having a biuret content of 3.0%, based upon the amount of urea, was heated in an autoclave to 190° at about 250 atmospheres pressure. After one hour the pressure on the melt was reduced and the gases were expelled by rapid heating. The resulting biuret content of the treated melt was measured as 0.27%, based upon the amount of urea.

*Example 3*

A mother liquor solution of urea (saturation temperature of 70° C.) from a urea filtration operation containing 6.5% biuret was heated in the presence of ammonia ($NH_3$=75%, by volume of the urea solution) to a temperature of about 180° C. in an autoclave maintained at a pressure of about 200 atmospheres. After 90 minutes the pressure on the melt was reduced and the ammonia was expelled by rapid heating. The resulting biuret content of the treated melt was measured as 5% of its original content.

The above examples clearly show that the biuret content of aqueous urea solutions as result from degassed or partially degassed synthesis operations may be easily reduced by ammoniation at elevated pressures and temperatures and that such procedure has a substantial advantage over prior practices wherein the reduction of biuret in urea liquors and solid form urea resulted in biuret contamination of the purifying medium. It will be appreciated that various modifications may be made in the invention described above without deviating from the scope thereof as defined in the appended claims.

I claim:
1. A process for purifying urea solutions containing biuret as an impurity, comprising essentially treating the biuret-containing urea solution with ammonia in a closed system at a temperature of from about 120–210° C. and at a pressure of from about 80 to 350 atmospheres, whereby the biuret content therein is reduced by ammoniation, and separating ammonia from the purified solution.

2. A process for purifying urea solutions containing biuret as an impurity, comprising essentially treating the biuret-containing urea solution with ammonia in a closed system at a temperature of from about 120–210° C. and at a pressure of from about 80 to 350 atmospheres, whereby the biuret content therein is reduced by ammoniation, and separating ammonia from the purified solution by reducing the pressure in the system and expelling the ammonia therefrom.

3. A process for purifying urea solutions containing ammonia and containing biuret as an impurity, comprising essentially treating the biuret-containing urea solution in a closed system at a temperature of from about 120–210° C. and at a pressure of from about 80 to 350 atmospheres whereby the biuret content therein is reduced by ammoniation by the contained ammonia, and separating ammonia and carbon dioxide from the purified solution by reducing the pressure in the system and expelling ammonia therefrom.

4. A process according to claim 1 wherein the biuret-containing urea solution treated comprises mother liquor and covering liquor from a urea crystallization process.

References Cited in the file of this patent

UNITED STATES PATENTS

| | | |
|---|---|---|
| 2,307,253 | Yee et al. | Jan. 5, 1943 |
| 2,527,315 | Mackay | Oct. 24, 1950 |

FOREIGN PATENTS

| | | |
|---|---|---|
| 586,025 | France | Dec. 20, 1924 |
| 125,219 | Switzerland | Apr. 2, 1928 |